(12) United States Patent
Linck et al.

(10) Patent No.: US 7,762,807 B2
(45) Date of Patent: Jul. 27, 2010

(54) GAS-FIRED RADIANT TUBE WITH INTERNAL RECUPERATOR

(75) Inventors: Martin Brendan Linck, Chicago, IL (US); Harry S. Kurek, Dyer, IN (US); Mark J. Khinkis, Morton Grove, IL (US); Aleksandr P. Kozlov, Buffalo Grove, IL (US)

(73) Assignee: Gas Technology Institute, Des Plaines, IL (US)

( * ) Notice: Subject to any disclaimer, the term of this patent is extended or adjusted under 35 U.S.C. 154(b) by 337 days.

(21) Appl. No.: 12/108,986

(22) Filed: Apr. 24, 2008

(65) Prior Publication Data

US 2009/0269710 A1 Oct. 29, 2009

(51) Int. Cl.
 *F23D 14/66* (2006.01)
(52) U.S. Cl. ............... 431/215; 431/216; 431/217; 431/207; 431/9; 431/2; 431/11; 431/199; 165/DIG. 141; 165/66; 165/141; 137/625.4; 126/91 A
(58) Field of Classification Search .......... 431/2, 431/9, 11, 199, 207, 215, 216, 217; 165/66, 165/141, DIG. 141; 137/625.4; 126/91 A
See application file for complete search history.

(56) References Cited

U.S. PATENT DOCUMENTS

| 4,401,099 A | 8/1983 | Collier |
| 4,705,022 A | 11/1987 | Collier |
| 5,016,610 A | 5/1991 | Meguro et al. |
| 5,241,949 A | 9/1993 | Collier |
| 6,321,743 B1 | 11/2001 | Khinkis et al. |

*Primary Examiner*—Kenneth B Rinehart
*Assistant Examiner*—Jorge Pereiro
(74) *Attorney, Agent, or Firm*—Mark E. Fejer (57) ABSTRACT

A single-ended, internally recuperated, radiant tube annulus system in which at least part of the heat recovery takes place within the furnace to which the system is attached and in which the oxidant and/or fuel are preheated not only by heat transfer from the exhaust gases, but also directly from the combustion process. The system includes a plurality of concentric radiant tubular members arranged in a manner providing an outer annular region in which the combustion process is carried out, an inner tubular member through which exhaust gases are exhausted from the system, and intermediate annular regions between the inner tubular member and the outer annular region through which preheated oxidant is provided to the outer annular region for the combustion process. In accordance with one embodiment of this invention, the internal recuperator is used as a fuel reformer.

16 Claims, 5 Drawing Sheets

GAS-FIRED RADIANT TUBE WITH INTERNAL RECUPERATOR

BACKGROUND OF THE INVENTION

1. Field of the Invention

This invention relates to a gaseous fuel fired, single-ended, fully internally recuperated radiant tube annulus system suitable for use in radiant tube heating applications, such as ferrous and nonferrous metal treatments, whereby, in addition to providing heat for transfer to the intended load, the products of combustion from the combustion of the gaseous fuel may be used to preheat the oxidant used for the combustion of the fuel and may be used for thermochemical recuperation.

2. Description of Related Art

Radiant tubes have long been used in industrial heating applications for heating a variety of materials, such as steel or other solid materials in a furnace. Conventionally, radiant tube heaters have been powered by electrical heating elements or by fuel-fired burners. Electrically heated radiant tubes basically comprise heating elements within a tube which extend into a furnace or work zone. The elements radiate heat to the tube and the tube radiates heat to the work. In high temperature heating applications, electrically heated radiant tubes are preferred because the heating elements radiate uniform heat flux to the tube and may radiate directly to the load. However, the cost of electricity often dictates that fuel-fired burners be used in place of the electrical heating elements to provide products of combustion into a tube which, in turn, will radiate heat to the work.

In conventional radiant tubes utilizing fuel-fired burners, the high-temperature combustion products are supplied into the radiant tube from one end thereof and, after having been used for heating, are then discharged from the other end thereof. It will be apparent that the discharged products of combustion still have a relatively high temperature. One radiant tube system, referred to as a single-ended radiant tube system, which has been developed to address this issue is a recuperative radiant tube burner system comprising an outer heat resistant radiant tube having a closed forward end in which is located an elongated recuperator tube which coacts with the radiant tube to define an annular exhaust passage for the flow of hot gases produced by a burner assembly disposed within the recuperator tube as taught by U.S. Pat. No. 5,241,949 to Collier and U.S. Pat. No. 4,705,022, also to Collier. U.S. Pat. No. 5,016,610 to Meguro et al. teaches a radiant-type heater having inner and outer concentric tubes and a fuel supply tube disposed within the inner concentric tube. The end of the outer concentric tube opposite the fuel supply end of the heater is closed off as a result of which combustion products resulting from combustion of the fuel from the fuel supply tube in the inner concentric tube are exhausted through the annulus formed between the inner and outer concentric tubes. U.S. Pat. No. 4,401,099 to Collier teaches a single-ended recuperative radiant tube assembly having inner and outer recuperative tube assemblies positioned in a counter-flow arrangement within a radiant tube assembly whereby hot exhaust gases emitted from the burner within the single-ended radiant tube assembly are directed through a flame tube to an annular exhaust chamber located between the outer recuperative tube and radiant tube assemblies. Ambient air flowing toward the burner in an air chamber between the inner and outer recuperator tube assemblies is heated by the exhaust gases in the annular exhaust chamber. And, U.S. Pat. No. 6,321,743 B1 to Khinkis et al. teaches a method and apparatus for combustion of a fuel and oxidant in which at least a portion of a fuel and at least a portion of an oxidant are introduced into an annular region formed by an outer tubular member closed off at one end and an inner tubular member open at both ends concentrically disposed within the outer tubular member, forming a fuel/oxidant mixture. The fuel/oxidant mixture is ignited in the annular region, forming products of combustion therein. The products of combustion are then exhausted through the inner tubular member providing oxidant preheating prior to forming the fuel/oxidant mixture.

In conventional radiant tube systems employing integrated recuperators, combustion air or oxidant is preheated exclusively by heat transfer from the exhaust gases exiting the systems. As a result, temperature gradients involved in the heat transfer to the incoming combustion air or oxidant are relatively low and measures must be taken to enhance heat transfer to make the system reasonably efficient. For example, more surface area may be required to transfer the desired amount of heat. In addition, heat transfer enhancements may result in greater pressure drops through the system, particularly where such enhancements require additional features, such as fins.

In conventional radiant tube systems employing an integrated recuperator, the burner assembly typically extends back a considerable distance from the upstream end of the radiant tube, as a result of which the assembly may project a substantial distance outward from the furnace wall to which the system is attached, thereby taking up a considerable amount of space in the area around the furnace.

In conventional radiant tube systems employing an integrated recuperator, no cooling is provided to any of the radiant tube components, thereby creating the potential for overheating of the tube components and necessitating the use of expensive high temperature metal alloys and ceramics capable of withstanding the operating conditions.

At the high operating temperatures of conventional radiant tube systems, there is the potential for the formation of a significant amount of $NO_x$ emissions. Total $NO_x$ formation, in addition to high operating temperatures, is a function of residence time and, in radiant tube systems employing an integrated recuperator, the residence time at the high temperature of air, fuel and combustion products is relatively long since the combustion products must move down the entire length of the radiant tube and then return before being cooled in the recuperator. Thus, $NO_x$ is generated along the entire flow path. Traditionally, flue gas recirculation, in which exhaust gases are entrained and used to reduce the oxygen concentration of the combustion air, has been used to reduce $NO_x$ formation. The reduced oxygen concentration slows the formation of $NO_x$ and slows combustion reactions as well so that heat is released as uniformly as possible. Flue gas recirculation may be carried out internally within the radiant tube or externally where the exhaust gases pass through the recuperator before being entrained in the combustion air and reintroduced into the burner. In systems using either internal or external flue gas recirculation, $NO_x$ emissions, corrected to an $O_2$ concentration of 3%, are in the range of about 70-100 ppm.

SUMMARY OF THE INVENTION

Accordingly, it is one object of this invention to provide a radiant tube system comprising an integrated recuperator in which the combustion air or oxidant is preheated by more than heat transfer from the exhaust gases generated by the combustion process.

It is another object of this invention to provide a radiant tube system comprising an integrated recuperator for implementation of thermochemical recuperation.

It is another object of this invention to provide a radiant tube system having a reduced footprint external to the furnace in which it is installed.

It is another object of this invention to provide a radiant tube system which provides more effective $NO_x$ control by reducing the residence time at high temperature of $NO_x$ forming species in the system.

It is yet another object of this invention to provide a radiant tube system having improved temperature control and uniformity to enable the use of less expensive materials in the production of the system.

These and other objects of this invention are addressed by a radiant tube system comprising an inner tubular member having an exhaust gas inlet end forming an exhaust gas inlet opening and having an exhaust gas outlet end forming an exhaust gas outlet opening. An inner intermediate tubular member having a preheated first gaseous fluid outlet end forming a preheated first gaseous fluid outlet opening proximate the exhaust gas inlet end of the inner tubular member and having a first gaseous fluid inlet end proximate the exhaust gas outlet end of the inner tubular member is concentrically disposed around the inner tubular member, forming an inner annular region between the inner tubular member and the inner intermediate tubular member. An outwardly extending circumferential flange is connected with the exhaust gas inlet end of the inner tubular member. An outer intermediate tubular member is concentrically disposed around the inner intermediate tubular member, forming an intermediate annular region between the outer intermediate tubular member and the inner intermediate tubular member. The outer intermediate tubular member comprises a first end connected with the outwardly extending circumferential flange and an opposite second end proximate the first gaseous fluid inlet end of the inner intermediate tubular member. An outer tubular member is concentrically disposed around the outer intermediate tubular member and is provided with a closed-off end proximate the exhaust gas inlet end of the inner tubular member and an opposite end proximate the exhaust gas outlet end of the inner tubular member, forming an opening through which each of the inner tubular member, inner intermediate tubular member and outer intermediate tubular member extends, and forming an outer annular region between the outer tubular member and the outer intermediate tubular member. Fluid communication means are provided for providing fluid communication between the outer intermediate annular region and the outer annular region and seal means are provided for sealing between the outer tubular member and the outer intermediate tubular member proximate the exhaust gas outlet end of the inner tubular member, between the outer intermediate tubular member and the inner intermediate tubular member proximate the exhaust gas outlet end of the inner tubular member, and between the inner intermediate tubular member and the inner tubular member proximate the exhaust gas outlet end of the inner tubular member. A first gaseous fluid conduit is connected with the inner intermediate tubular member proximate the first gaseous fluid inlet end which is in fluid communication with the inner annular region, and a second gaseous fluid conduit is connected with the opposite end of the outer tubular member proximate the exhaust gas outlet end of the inner tubular member which is in fluid communication with the outer annular region.

BRIEF DESCRIPTION OF THE DRAWINGS

These and other objects and features of this invention will be better understood from the following description taken in conjunction with the drawings wherein.

DETAILED DESCRIPTION OF THE PRESENTLY PREFERRED EMBODIMENTS

The efficiencies referred to herein for radiant tube systems are calculated based upon the temperatures of the exhaust gases exiting the radiant tube system. In order to determine the efficiency of the radiant tube system, the fuel flow rate, oxidant flow rate, and chemical composition of the fuel used by the system must all be known. With this information, the amount of energy released by complete combustion of the available fuel is calculated. The proportion of this energy remaining in the exhaust gas is determined by measuring the exhaust gas temperature. As the thermal efficiency of the system increases, the exhaust gas temperature decreases.

Unrecuperated radiant tube systems are generally quite inefficient and their efficiencies decrease rapidly with increasing furnace temperatures. A U-shaped radiant tube system equipped with a simple unrecuperated burner is approximately 44% efficient at a furnace temperature of about 1575° F., which corresponds to an exhaust gas temperature of about 2100° F. Single-ended radiant tube systems are somewhat different in design from U-shaped tube systems but still have unacceptably low efficiencies. With a recuperated reverse annulus single-ended radiant tube system as taught in U.S. Pat. No. 6,321,743 B1 discussed herein above, the thermal efficiency is usually in the range of about 60-65% when the system is operated at furnace temperatures of about 1650° F. Any commercially viable radiant tube system should provide comparable efficiencies.

Figure 1:
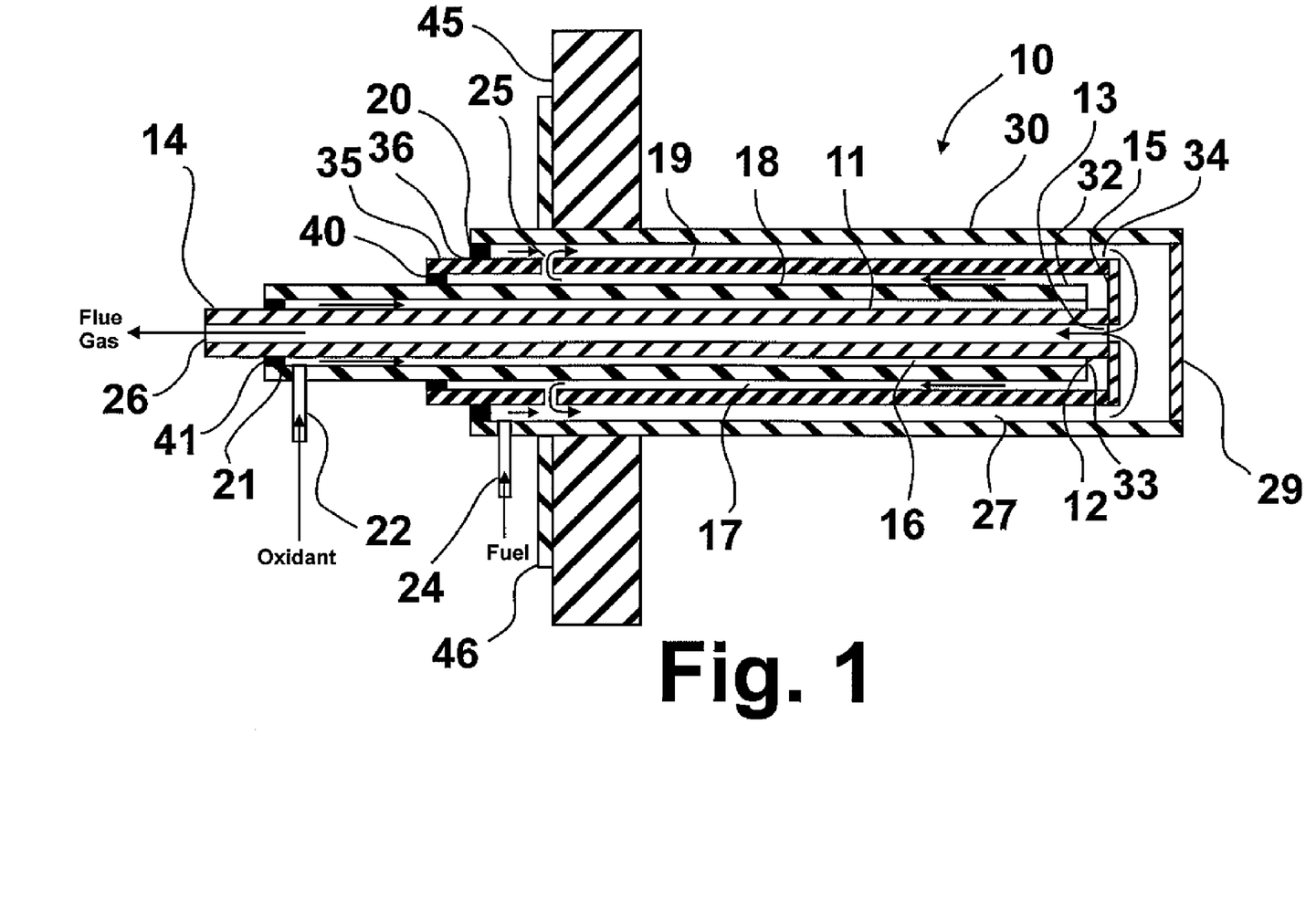
FIG. 1 is a lateral cross-sectional view of the radiant tube system in accordance with one embodiment of this invention.

FIG. 1 shows a radiant tube system having an internal recuperator in accordance with one embodiment of this invention. As shown therein, radiant tube system 10 comprises inner tubular member 11 having exhaust gas inlet end 12 forming exhaust gas inlet opening 13 and having exhaust gas outlet end 14 forming exhaust gas outlet opening 26. Connected with exhaust gas inlet end 12 of inner tubular member 11 is outwardly extending circumferential flange 15. Inner intermediate tubular member 18 having preheated oxidant outlet end 32 forming preheated oxidant outlet opening 33 proximate exhaust gas inlet end 12 of inner tubular member 11 is concentrically disposed around inner tubular member 11, forming inner annular region 16 between inner tubular member 11 and inner intermediate tubular member 18. Outer intermediate tubular member 19 is concentrically disposed around inner intermediate tubular member 18, forming intermediate annular region 17 between inner intermediate tubular member 18 and outer intermediate tubular member 19. One end 34 of outer intermediate tubular member 19 is connected with outwardly extending circumferential flange 15 so as to close off inner annular region 16 and intermediate annular region 17, and the opposite end 35 is proximate oxidant inlet end 21 of inner intermediate tubular member 18. Outer tubular member 30 having a closed off end 29 proximate exhaust gas inlet end 12 of inner tubular member 11 and having an opposite end proximate exhaust gas outlet end 14 of inner tubular member 11 forming an opening 36 through which each of the inner tubular member, the inner intermediate tubular member and the outer intermediate tubular member extends is concentrically disposed around outer intermediate tubular member 19, forming outer annular region 27 between outer tubular member 30 and outer intermediate tubular member 19. Fluid communication means are provided for enabling fluid communication between outer annular region 27 and intermediate annular region 17. In accordance with one embodiment, fluid communication is provided by openings 25 formed by outer intermediate tubular member 19 proximate exhaust gas outlet end 14 of inner tubular member 11. Seal means 20, 40, 41 are provided for sealing between outer tubular member 30 and outer intermediate tubular member 19, for sealing between outer intermediate tubular member 19 and inner intermediate tubular member 18, and for sealing between inner intermediate tubular member 18 and inner tubular member 11 proximate exhaust gas outlet end 14 of inner tubular member 11. Fuel conduit 24 is connected with outer tubular member 30 and is in fluid communication with outer annular region 27 and oxidant conduit 22 is connected with inner intermediate tubular member 18 and is in fluid communication with inner annular region 16.

The tubular members, in accordance with one embodiment of this invention, are constructed of a material selected from the group consisting of metal alloys and ceramics. In accordance with one preferred embodiment of this invention, the tubular members are constructed of stainless steel. In accordance with another preferred embodiment of this invention, the tubular members are constructed of SiC.

In operation in accordance with one embodiment of this invention, an oxidant is introduced through oxidant conduit 22 into inner annular region 16 and fuel is introduced through fuel conduit 24 into outer annular region 27. Oxidant flows through inner annular region 16, through intermediate annular region 17 and into outer annular region 27 in which it mixes with the fuel. The oxidant/fuel mixture is ignited and burns in outer annular region 27. The combustion products from the combustion process flow through exhaust gas inlet opening 13 of inner tubular member 11, through inner tubular member 11, and through exhaust gas outlet opening 26.

The crux of this invention is the internal recuperator which extends nearly the entire length of the radiant tube, providing the ability of the radiant tube system to preheat the oxidant and heat the furnace, all the while increasing the efficiency of the radiant tube system when compared with conventional radiant tube systems. Accordingly, as the exhaust gases are exhausted through inner tubular member 11, heat from the exhaust gases is transferred through the wall of inner intermediate tubular member 18 and to the oxidant flowing through inner annular region 16. From the inner annular region 16, the preheated oxidant flows through preheated oxidant outlet opening 33 into intermediate annular region 17 in which additional heat from the combustion process in outer annular region 27 is transferred to the oxidant.

Figure 2:
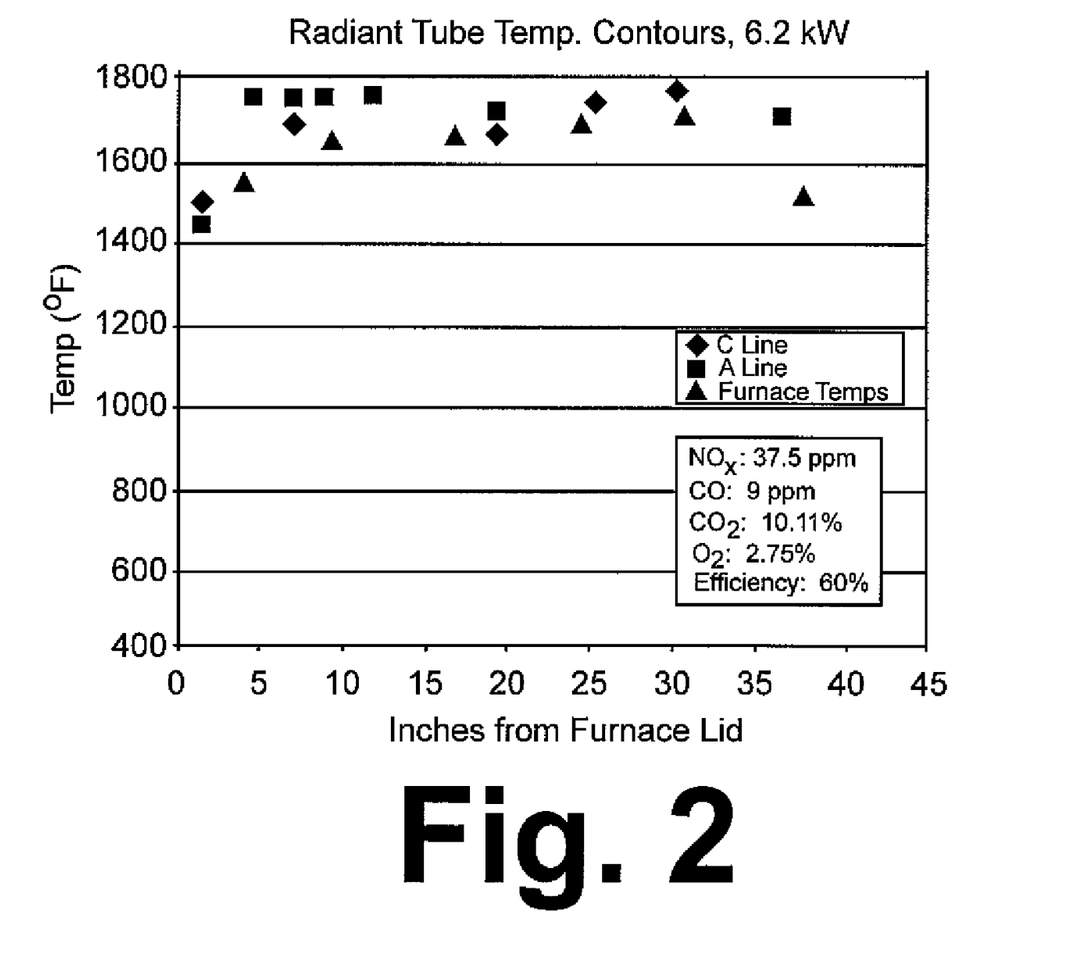
FIG. 2 is a diagram showing temperature contours, system efficiency, and exhaust compositions of a radiant tube system operating at a firing rate of 6.2 kW in accordance with one embodiment of this invention over a range of firing rates.
Figure 3:
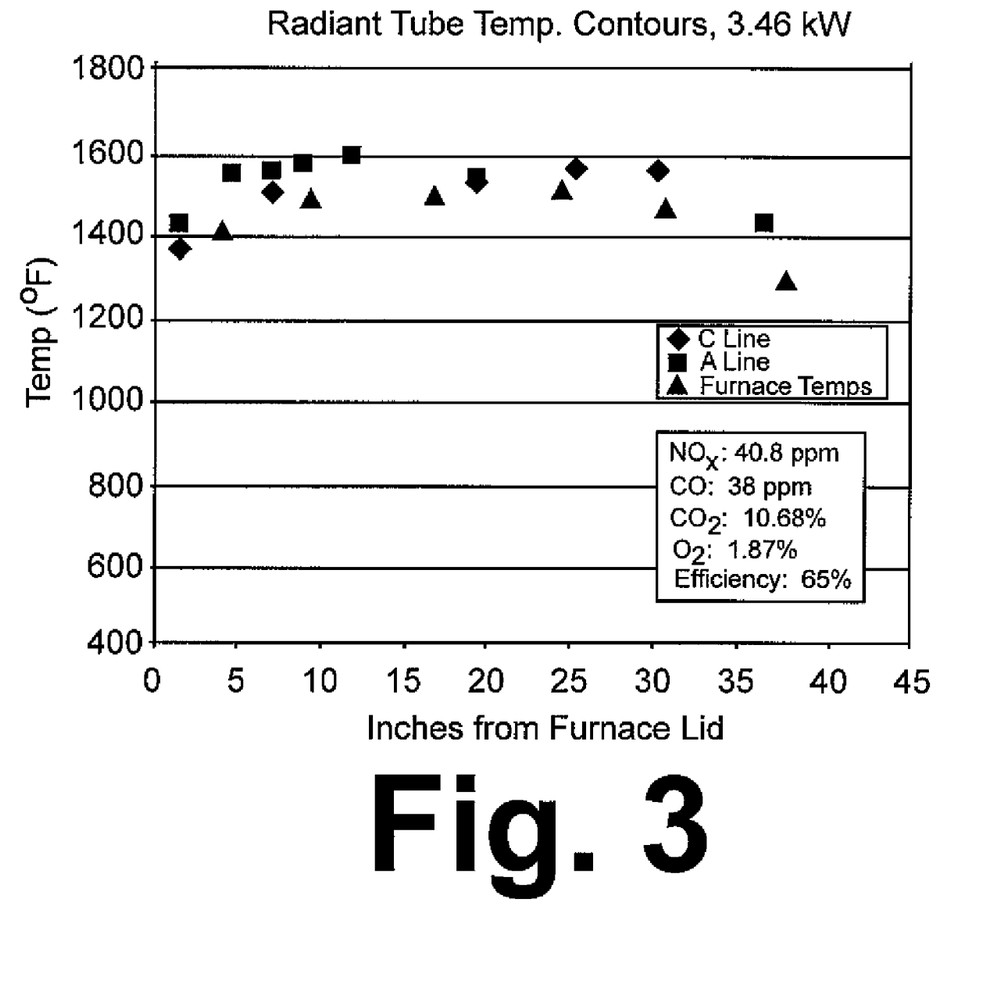
FIG. 3 is a diagram showing temperature contours, system efficiency, and exhaust compositions of a radiant tube system operating at a firing rate of 3.46 kW in accordance with one embodiment of this invention over a range of firing rates.

Several tests were conducted using the radiant tube system of this invention which demonstrate the improvements achieved by the radiant tube system of this invention compared to conventional radiant tube systems. FIG. 2 shows the temperature contours of a radiant tube in accordance with one embodiment of this invention together with radiant tube efficiency and emissions. The radiant tube system was equipped with a set of swirlers proximate the closed-off end of the outer tubular member to improve mixing and a swirler insert in the inner tubular member through which the exhaust gases are exhausted from the system. The system was fired at a rate of about 6.2 kW in a furnace at a temperature of about 1650° F. The radiant tube system temperature contour was measured using two thermocouple lines (C Line and A Line) disposed along the length of the radiant tube system as well as thermocouples installed in the furnace. As shown in FIG. 2, an efficiency of about 60% was achieved, which is substantially higher than the efficiency of unrecuperated systems and on a par with integrated, external recuperators. FIG. 3 shows comparable data for a radiant tube in accordance with one embodiment of this invention firing at a rate of 3.46 kW in a furnace at a temperature of about 1500° F. The data of FIGS. 2 and 3 demonstrates the ability of the radiant tube system in accordance with one embodiment of this invention to provide effective recuperation across a range of firing rates and operating conditions and to maintain thermally efficient combustion ranging between 60-65% over a turndown ratio of about 50%.

Using the radiant tube system of this invention, the achievement of complete combustion while maintaining low $NO_x$ emissions is relatively easy. Because the exhaust gases produced by the combustion process in the outer annular region are forced to turn 180° to exit through the inner tubular member, significant mixing is produced as the exhaust gases exit the outer annulus and enter the inner tubular member. In addition, the inner tubular member is sufficiently hot so as to avoid quenching of the combustion, thereby resulting in low concentrations of carbon monoxide (CO) and total hydrocarbons in the exhaust.

Because the recuperator of the radiant tube system of this invention is internal, most of the recuperative heat recovery occurs within the furnace. As shown in FIG. 1, radiant tube system 10 is connected by connection means, such as a flange 46, with furnace wall 45. As can clearly be seen, virtually all of the heat transfer associated with the radiant tube system occurs within the furnace. As a consequence, only a small portion of the system extends beyond the furnace wall to the exterior of the furnace.

An additional benefit of the radiant system of this invention is the ability to cool areas of the radiant tube which might otherwise overheat. In particular, the entire recuperator assembly is cooled by the combustion air or oxidant flowing through the system.

As previously indicated, $NO_x$ emissions are a particular problem in gas-fired radiant tube burners. Typically, it is necessary to provide large amounts of flue gas recirculation in order to reduce $NO_x$ formation. In the radiant tube system of this invention, no flue gas recirculation is employed and yet the $NO_x$ concentrations measured in the exhaust gases as shown in FIGS. 2 and 3 are in the range of about 40-50 ppm at $O_2$ concentrations less than about 3%, substantially below the 100 ppm levels observed with conventional radiant tube systems.

Thermochemical recuperation is a process by which waste heat may be captured as chemical energy and returned to a combustor in a way that improves the thermodynamic efficiency of the combustion system. More particularly, thermochemical recuperation is a method by which a hydrocarbon fuel is reacted with water vapor and/or $CO_2$ in a heated environment to produce a reformate fuel gas comprising residual hydrocarbons, CO and hydrogen ($H_2$) as reforming reaction products. The reforming reaction is endothermic and, thus, proceeds most effectively at very high temperatures. The total chemical energy in the reformate fuel gas is greater than the chemical energy in the unreformed fuel, and the waste heat, which might otherwise be lost to the environment is recaptured and returned to the combustion system. The required water vapor may be introduced to the hydrocarbon fuel stream, as a stream of pure water vapor from a steam generator, as a stream of liquid water, which then evaporates into the hydrocarbon fuel stream, or as a component of the exhaust gas from the combustion process which is mixed with the hydrocarbon fuel stream. For applications in which exhaust gas is used as a water vapor source, the hydrocarbon fuel-bearing stream to be reformed will contain a mixture of exhaust gas comprising $CO_2$, water vapor, and hydrocarbon fuel. If air is used as the oxidant for the combustion process by which the exhaust gas is produced, the exhaust gas will also contain about 70% nitrogen, the presence of which will reduce the rate of the reforming reactions. However, if oxygen is used as the oxidant, the exhaust gas will consist substantially of $CO_2$ and $H_2O$. The substantial absence of nitrogen will result in an increase in the effectiveness of the thermochemical recuperator as a recuperation strategy.

Figure 4:
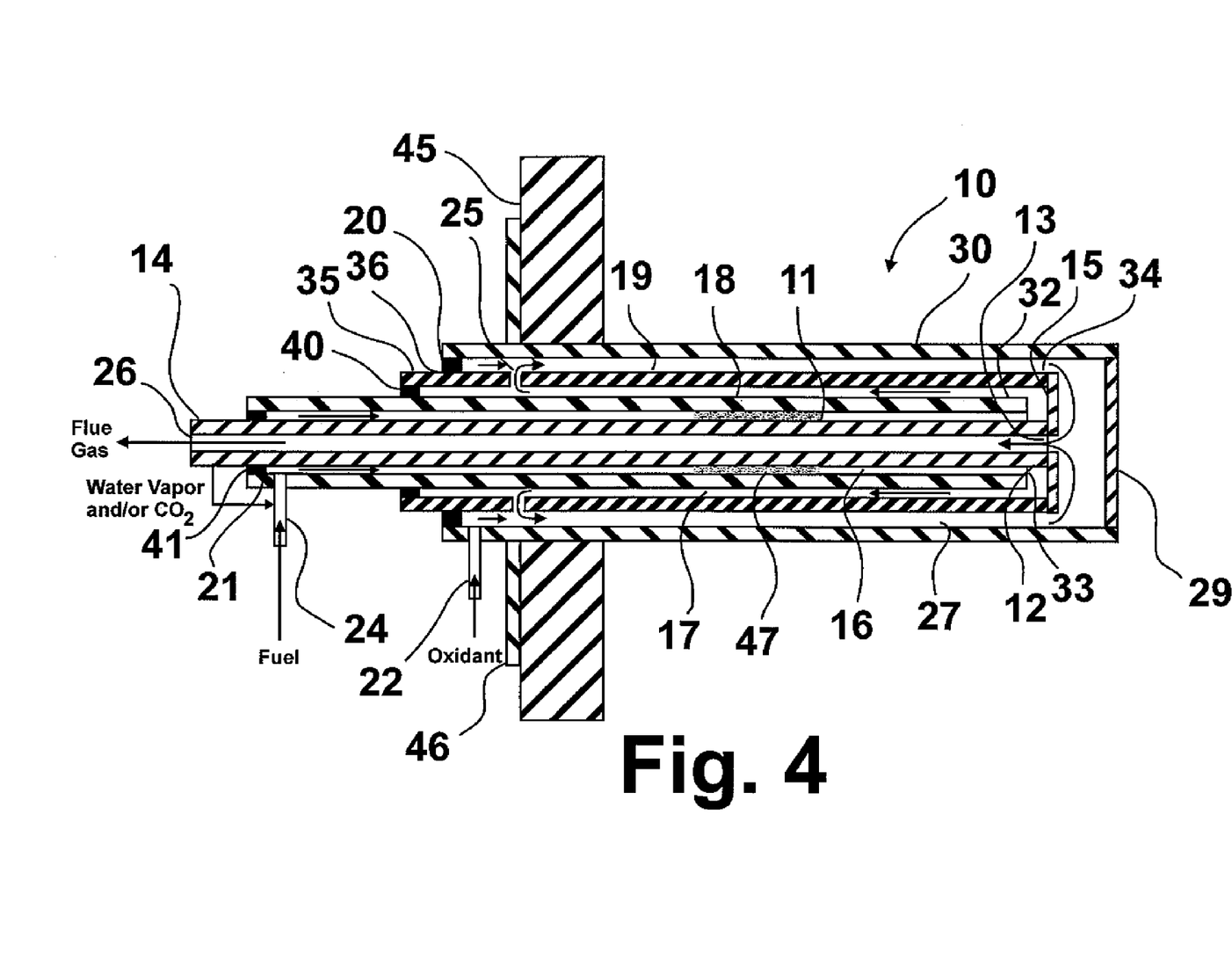
FIG. 4 is a cross-sectional diagram showing a radiant tube system with a thermochemical recuperator in accordance with one embodiment of this invention.

FIG. 4 shows a radiant tube system in accordance with one embodiment of this invention in which the internal recuperator is used for thermochemical recuperation. In contrast to the embodiment of this invention shown in FIG. 1, fuel conduit 24 is connected with inner intermediate tubular member 18 and is in fluid communication with inner annular region 16 and oxidant conduit 22 is connected with outer tubular member 30 and is in fluid communication with outer annular region 27. As a result, the fuel for reforming within inner annular region 16 is heated in part by heat in the exhaust gas generated by the combustion of the reformed fuel and oxidant in outer annular region 27 and exhausted through inner tubular member 11. An additional portion of heat is provided to the fuel to be reformed by a portion of the exhaust gas comprising water vapor and/or $CO_2$ which is mixed with the fuel prior to the fuel being introduced into inner annular region 16. Thus, in this case, the internal recuperator of the radiant tube system of this invention acts as a fuel reformer and does not preheat the oxidant used for combustion of the reformed fuel.

Figure 5:
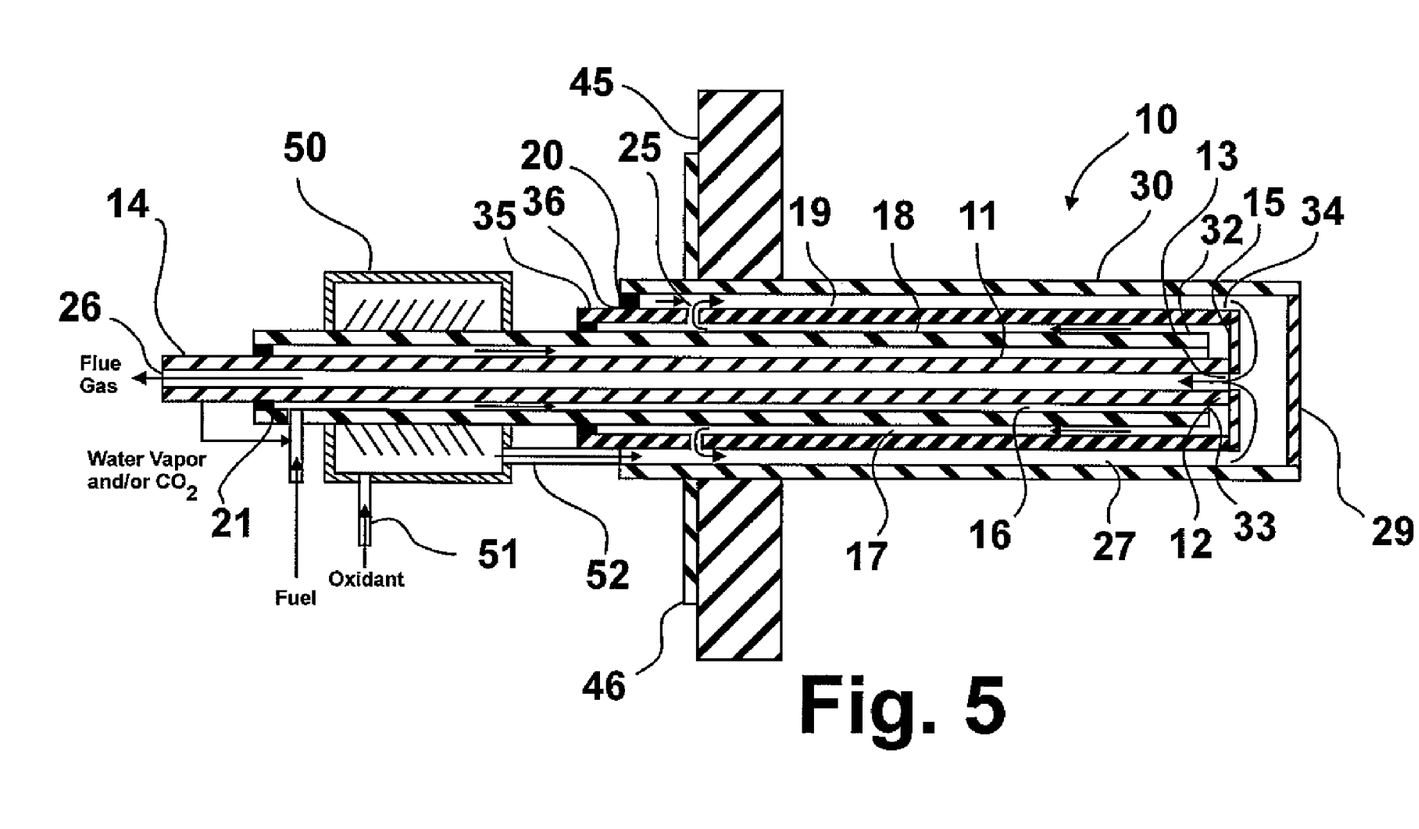
FIG. 5 is a cross-sectional diagram showing a radiant tube system with a thermochemical recuperator and external oxidant recuperator in accordance with one embodiment of this invention.

When the internal recuperator is used for fuel reforming as described above, preheating of the oxidant may be addressed in accordance with one embodiment of this invention as shown in FIG. 5 in which an external oxidant recuperator 50 is provided in heat exchange relation with inner annular region 16 in which combustion of the reformed fuel is initiated. In accordance with this embodiment, oxidant is introduced through oxidant conduit 51 into oxidant recuperator 50 in which the oxidant is heated. The heated oxidant is then passed through a conduit 52 providing fluid communication between heat exchanger 50 and outer annular region 27.

It will be appreciated by those skilled in the art that in some instances fuel reforming requires the use of a catalyst to promote the reforming reaction. Accordingly, in accordance with one embodiment of this invention, a suitable reforming catalyst 47 is disposed within inner annular region 16 as shown in FIG. 4. Suitable catalysts include certain metals and metal alloys. The catalyst may be disposed on the interior surfaces of the internal recuperator or, alternatively, may be in the form of particles disposed within the annular regions of the recuperator.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A radiant tube system comprising:

an inner tubular member having an exhaust gas inlet end forming an exhaust gas inlet opening and having an exhaust gas outlet end forming an exhaust gas outlet opening;

an outwardly extending circumferential flange connected with said exhaust gas inlet end of said inner tubular member;

an inner intermediate tubular member concentrically disposed around said inner tubular member having a preheated first gaseous fluid outlet end forming a preheated first gaseous fluid outlet opening proximate said outwardly extending circumferential flange, a first gaseous fluid inlet end proximate said exhaust gas outlet end of said inner tubular member, and forming an inner annular region between said inner tubular member and said inner intermediate tubular member;

an outer intermediate tubular member concentrically disposed around said inner intermediate tubular member forming an outer intermediate annular region between said outer intermediate tubular member and said inner intermediate tubular member and having a first end connected with said outwardly extending circumferential flange and having an opposite second end proximate said first gaseous fluid inlet end of said inner intermediate tubular member;

an outer tubular member concentrically disposed around said outer intermediate tubular member having a closed-off end proximate said exhaust gas inlet end of said inner tubular member, an opposite end proximate said exhaust gas outlet end of said inner tubular member forming an opening through which each of said inner tubular member, inner intermediate tubular member and outer intermediate tubular member extends, and forming an outer annular region between said outer tubular member and said outer intermediate tubular member;

fluid communication means for providing fluid communication between said outer intermediate annular region and said outer annular region;

seal means for sealing between said outer tubular member and said outer intermediate tubular member proximate said exhaust gas outlet end of said inner tubular member proximate said exhaust gas outlet end of said inner tubular member, between said outer intermediate tubular member and said inner intermediate tubular member proximate said exhaust gas outlet end of said inner tubular member, and between said inner intermediate tubular member and said inner tubular member proximate said exhaust gas outlet end of said inner tubular member;

a first gaseous fluid conduit connected with said opposite end of said outer tubular member proximate said exhaust gas outlet end of said inner tubular member and in fluid communication with said outer annular region; and a second gaseous conduit connected with said inner intermediate tubular member proximate said first gaseous fluid inlet end and in fluid communication with said inner annular region.

2. The system of claim 1, wherein said tubular members are constructed of a material selected from the group consisting of metal alloys and ceramics.

3. The system of claim 2, wherein said tubular members are constructed of stainless steel.

4. The system of claim 2, wherein said tubular members are constructed of SiC.

5. The system of claim 1, wherein said combustion products inlet end of said inner tubular member is disposed at a distance from said closed-off end of said outer tubular member.

6. The system of claim 1, wherein a reforming catalyst is disposed within said inner annular region.

7. The system of claim 1 further comprising a heat exchanger disposed around said inner intermediate tubular member in heat exchange relation with said inner intermediate tubular member and in fluid communication with said outer annular region.

8. The system of claim 7, wherein said fluid communication between said heat exchanger and said outer annular region is provided by said first gaseous fluid conduit.

9. A method for combustion of a fuel and oxidant comprising the steps of:

introducing a first gaseous fluid into an inner annular region formed by an inner tubular member having an exhaust gas inlet end forming an exhaust gas inlet opening and having an exhaust gas outlet end forming an exhaust gas outlet opening and an inner intermediate tubular member concentrically disposed around said inner tubular member having a preheated first gaseous fluid outlet end forming a preheated first gaseous fluid outlet opening proximate said exhaust gas inlet end of said inner tubular member and a first gaseous fluid inlet end proximate said exhaust gas outlet end of said inner tubular member, whereby said first gaseous fluid flows in a direction of said exhaust gas inlet end of said inner tubular member, producing a preheated first gaseous fluid;

passing said preheated first gaseous fluid through an outer intermediate annular region formed between said inner intermediate tubular member and an outer intermediate tubular member concentrically disposed around said inner intermediate tubular member whereby said preheated first gaseous fluid flows in a direction of said exhaust gas outlet end of said inner tubular member;

introducing a second gaseous fluid into an outer annular region formed between said outer intermediate tubular member and an outer tubular member concentrically disposed around said outer intermediate tubular member and introducing said preheated first gaseous fluid into said outer annular region, resulting in mixing of said preheated first gaseous fluid and said second gaseous fluid;

igniting said mixture in said outer annular region, forming a flame and producing exhaust gas;

introducing said exhaust gas through said exhaust gas inlet opening into said inner tubular member; and exhausting said exhaust gas through said exhaust gas outlet opening of said inner tubular member.

10. The method of claim 9, wherein said first gaseous fluid is preheated by heat from said flame and heat from said exhaust gas flowing through said inner tubular member prior to mixing with said second gaseous fluid.

11. The method of claim 9, wherein said first gaseous fluid is an oxidant and said second gaseous fluid is a fuel.

12. The method of claim 9, wherein said first gaseous fluid is a fuel and said second gaseous fluid is an oxidant.

13. The method of claim 12, wherein said preheated first gaseous fluid is a reformed fuel produced by reforming of said fuel within said inner annular region.

14. The method of claim 13, wherein said fuel is mixed with at least one of water vapor and $CO_2$ prior to being reformed.

15. The method of claim 13, wherein said fuel is mixed with a portion of said exhaust gas prior to being reformed.

16. The method of claim 9, wherein said second gaseous fluid is preheated in an external heat exchanger prior to being introduced into said outer annular region.

* * * * *